United States Patent [19]
Herwig et al.

[11] 3,759,999
[45] Sept. 18, 1973

[54] METHOD OF PURIFYING ACIDIC COMPONENTS OF A HOP EXTRACT

[75] Inventors: William C. Herwig, Milwaukee; Donald H. Westermann, Brookfield, both of Wis.

[73] Assignee: Miller Brewing Company, Milwaukee, Wis.

[22] Filed: Sept. 22, 1967

[21] Appl. No.: 669,947

[52] U.S. Cl. .............................. 260/586 R, 99/50.5
[51] Int. Cl. ............................................. C07c 45/24
[58] Field of Search ....................... 260/586, 586 R; 99/50.5

[56] References Cited
UNITED STATES PATENTS
3,433,642   3/1969   Nakayama et al. ................... 99/50.5

OTHER PUBLICATIONS
Armononds et al. Journ. of the Institute of Brewing, Vol. 68, pp. 495-503 (1962).

Howard et al. Jour. Inst. Brew. Vol. 66, pp. 305-312, 1960.

Alderton et al., Analytical Chemistry Vol. 26 pp 983-992 (1954).

Simmonds et al. Jour. Inst. Brew. Vol. 68 pg 495 (1962).

Howard et al. Jour. Inst. Brew. Vol. 66 pg 305 (1960).

*Primary Examiner*—Leon Zitver
*Assistant Examiner*—Norman Morgenstern
*Attorney*—Charles L. Harness and Kenneth E. Prince

[57] ABSTRACT

A method for separating isohumulones from lupulones and residual hop constituents as contained in e.g., an isomerized hop extract, by means of a strongly basic ion exchange resin.

6 Claims, 1 Drawing Figure

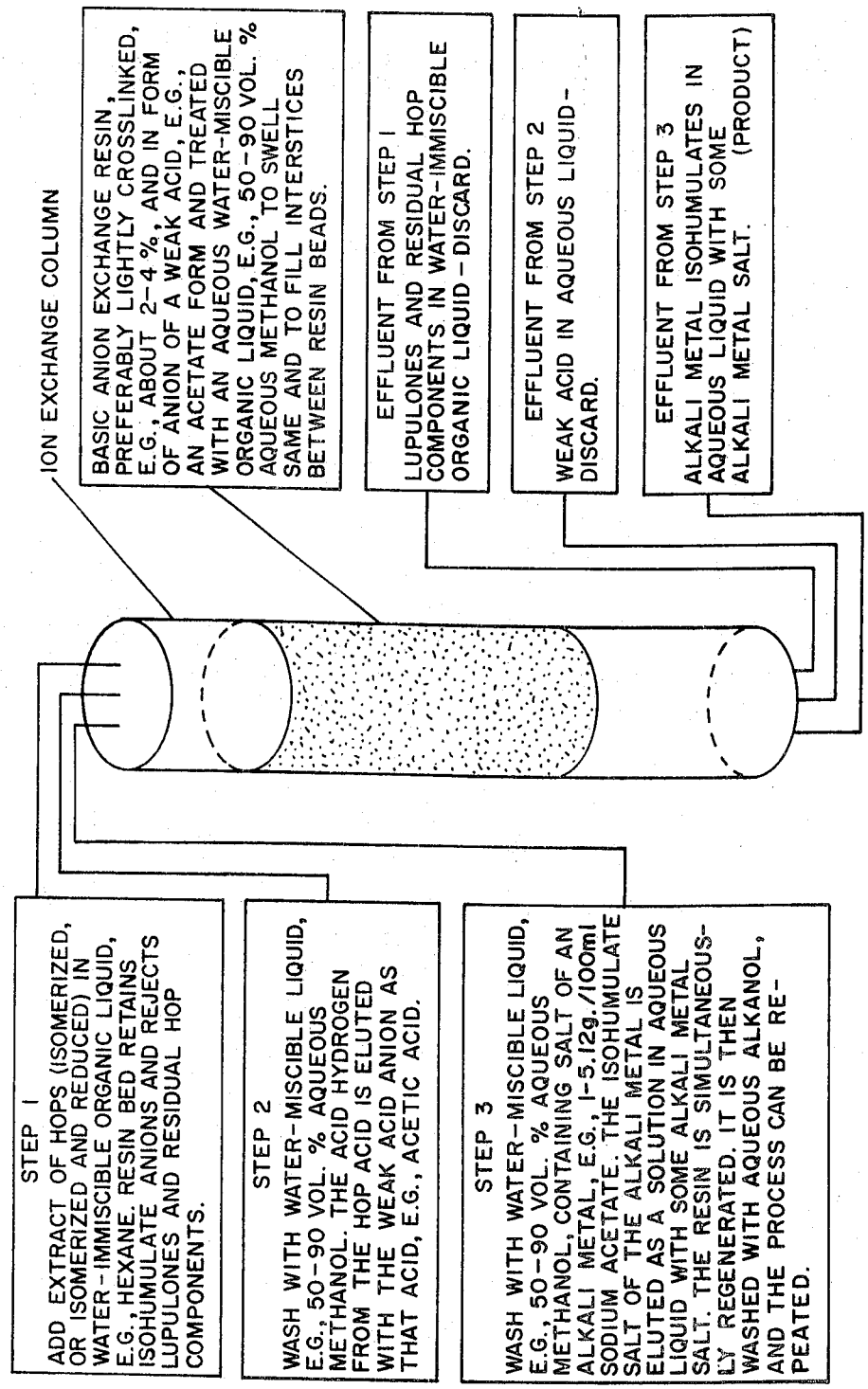

METHOD OF PURIFYING ACIDIC COMPONENTS OF A HOP EXTRACT

BACKGROUND OF THE INVENTION

1. Field of the Invention

Hops have been used traditionally in the brewing of beer and ales for the past several centuries, imparting to the beverage a pleasing bitterness, mild hop aroma, and a creamy head of foam. The composition of hops is quite complex, consisting of not only cellulosic material and moisture, but nitrogenous matter, pectins, tannins, resins, essential oils and ask. The most important components are the essential oils and the resins, which contribute the attributes of the hop.

The bitterness of beer is due primarily to the total soft resin fractions of hops, and, more specifically, to the alpha-acid content, providing that fresh hops are used. The most effective way to utilize hops in the brewing process is through addition of hop extracts; more specifically, to add the desirable components of an extract at various stages of the brewing process to produce required results. The specificity of organic solvents to selectively dissolve certain hop components is well known, dating back to the turn of the century. This phenomenon enabled hop chemists to separate out waxes, hard resins, total soft resins, tannins and pectins by proper selection of solvents. (For example, all components except tannins and pectins are soluble in diethyl ether; waxes are insoluble in cold methanol; total soft resins are soluble in light petroleum hydrocarbons.) The property of preferential solubility is used in the preparation of commercial extracts.

Solvent extracts of hops have been found to be stable for several years even when stored under adverse conditions, but most commerical extracts available on the market today must be added to the brew kettle in order to convert the alpha-acids, humulones, to the more water soluble bitter isohumulones. However, when such extracts are used, only 25–33% of the potentially available isohumulone is found in the finished beer. The remaining isohumulone precipitates with the wort proteins during boiling and cooling, precipitates from beer due to the drop in pH during fermentation, is oxidized in the kettle boil, or is adsorbed on the yeast. Insignificant amounts are lost through further processing of the finished beer.

The commercial processes for preparing isomerized hop extract for beer commonly result in a mixture of isohumulones, lupulones, essential oils, soft resins, and sundry minor components. Of this mixture only the isohumulones are of real value in beer. The other materials contribute little to flavor or the character of the foam.

Various methods of separating isohumulones from the aforesaid other components of an isomerized hop extract are known. In general, however, these methods are costly and tedious, involving a number of solvent extraction steps and generally not resulting a substantially 100 percent yield of isohumulones substantially free from the other hop components in the starting extract. The instant invention, on the other hand, does in fact accomplish these desired aims while being economic and efficient.

2. Description of the Prior Art

Some of the prior art methods in this field include the following. Beyaert and Cornard Chem. Abs., 42, 7927B (1948), were able to resolve the total soft resins into humulone, lupulone and unidentified soft resin through the use of a silica gel column. Rigby and Bethune, A.S.B.C. Proc., 1952, 98, separated humulone and lupulone from the other components of the total soft resin using countercurrent distribution and, with further modifications, were able to separate the isomerized alpha-acids into isoadhumulone, isohumulone, and isocohumulone. Rigby and Bethune, A.S.B.C. Proc. 1953, 119, also separated the alpha-acids into their analogs and applied these techniques to continuous countercurrent extraction of a hop extract, Can. U.S. Pat. 619,563, and claim separation into oils, soft resins, lupulones, hard resins and humulones. The latter were resolved into their analogs and subsequently isomerized. Alderton et al, Anal. Chem., 26,983 (1954), reported the adsorption of humulone and lupulone by a strongly basic ion exchange resin, such as Amberlite IRA 400, from alcoholic media but not from petroleum ether. Verzele and Govaert, Wall. Comm., 18,181 (1955), were able to separate the hop alpha-acids into their analogs using partition chromatography on buffered silica gel with iso-octane as the moving immiscible phase. Spetsiz and Steninger, J. Inst. Brew., 62,333 (1956), were able to resolve the isohumulones in beer into their analogs with reversed phase partition chromatography using silinized diatomaceous earth impregnated with carbon tetrachloride and aqueous buffered methanol as the moving immiscible phase. Howard and Slater, J. Inst, Brew., 66,305 (1960), were able to adsorb the acidic components of hops from a methanolic solution on a basic ion exchange resin (Dowey 1 × 4) in the acetate form and eluted the components with a methanolic acetic acid gradient. The acidic components could be separated from the remainder of the hop components by eluting with aqueous methanolic sodium chloride. Simmonds and Wilson, J. Inst. Brew., 68,495 (1962), where able to separate isohumulone, isocohumulone, lupulone, colupulone, humulone, and cohumulone from one another using a basic ion exchange (Dowex 1 × 4) column in the acetate form with 20% 2M aqueous sodium acetate in methanol at 40°C. A preisomerized extract was also separated into its components using a similar system. In the two previously described ion exchange systems the resin and the extract are in a polar, water soluble volvent (methanol) system.

SUMMARY OF THE INVENTION

In summary, this invention is directed to separating the isohumulones from lupulones and residual hop constituents in an isomerized hop extract dissolved in a water-immiscible organic solvent by the process comprising bringing the solution into intimate contact with particles of a strongly basic ion exchange resin containing an aqueous solution of a water-miscible solvent (preferably but not necessarily a lower alkanol), the interstices between the particles being occupied by a water-immiscible organic solvent, whereby said isohumulones are selectively taken up or adsorbed by the resin, followed by eluting the said isohumulones from the resin with a lower-alkanolic aqueous solution of a salt to give a final solution of said isohumulones substantially free from said lupulones and residual hop constituents.

The process of the invention is shown in diagrammatic form in the drawing. The process of the invention may be described generally as follows. The basic anion exchange resin must first be put in suitable form to separate isohumulates from lupulones. These resins are generally available in chloride form, and if obtained in this form must be converted to the form of a salt of a weak acid, suitably to the acetate form. This is done by placing the resin in the column and washing with an aqueous solution containing ions of a weak acid, e.g., with aqueous acetic acid, sodium acetate solution (1.0 N) or the like. The resin is washed free of excess acetate or like ions with water. The resin, now in the form of a salt of a weak acid, e.g., in the acetate form, is washed with a water-miscible solvent (e.g., 50–90 percent vol. percent methanol) to allow inclusion of the said solvent into the interiors of the resin beads or particles.

The step next to be described is optional. If desired, it can be omitted (cf. Example 1) with only a very slight reduction in yield. In this optional step the water-miscible solvent present in the interstices between the resin particles is washed out with an inert water-immiscible organic liquid solvent for isohumulones, e.g., hexane. This treatment does not operate to remove the water-miscible solvent or liquid, e.g., aqueous alkanol, from within the resin beads, but only from the space between the beads, i.e., from their interstices. This water-immiscible solvent is preferably saturated with the aforsaid water-miscible solvent before use in this step. For example, if hexane is used as the water-immiscible solvent in this step, and if methanol-water is used as the water-miscible solvent, the hexane is preferably saturated with the methanol-water solution, to reduce extraction of aqueous phase from the interiors of the particles into the nonaqueous phase in the resin interstices. The system at this point (using this optional step) therefore consists of resin beads swollen with water-miscible liquid, with their interstices filled with the water-immiscible organic liquid (e.g., hexane saturated aqueous alcohol). If this optional step is not used, the interstices between the beads will of course still be filled with the water-miscible solvent or liquid. In either case, the resin bed is now ready for use in the extraction process next described.

An extract of hops (isomerized, or isomerized and reduced), and also containing lupulones and residual hop constituents, in an inert water-immiscible organic liquid solvent, and which can (though it need not be) the same as the inert water-immiscible organic liquid referred to in the preceding paragraph, is added to the column. In this step the resin bed retains both he isohumulate anions and the hydrogen ions from the hop acid (isohumulones), whereas the lupulones and residual hop constituents pass through with the effluent. The acetate or like anions in the resin particles are not exchanged to the effluent stream, but rather are apparently exchanged within the resin particles, and at this stage stay with the particles.

Next, water-miscible solvent, e.g., 50–90 vol. percent methanol is passed through the resin bed to elute the acid hydrogen (hydrogen ions) along with acetate ion, as acetaic acid. Minor amounts of residual lupulone and degradation materials, etc. are also washed out in this step.

Next, a solution of a salt the anion of which is capable of displacing the isohumulate anion, viz., an alkali metal salt, e.g., 1–5 g./100 ml. of sodium acetate in aqueous alkanol 1.17g/100 mm. of sodium chloride in aqueous methanol (Example 2); 5.12g/100ml of ammonium acetate in aqueous methanol (Example 8); 3.84g/100ml of sodium propionate in aqueous methanol (Example 12); or 2.62g/100ml of sodium formate in aqueous methanol (Example 13), is passed through the resin bed. This replaces the isohumulate anions with anions of the alkali metal salt, e.g., with acetate anions, with simultaneous regeneration of the resin in such case to the acetate form and elution of the replaced isohumulate ions. The effluent, or eluate, consisting essentially of alkali metal (e.g., sodium) isohumulates in aqueous alkanol, with some sodium acetate (when this salt is used), and substantially free from lupulones and residual hop components, is recovered and may be treated further to cover pure isohumulates by conventional procedures.

The regenerated resin bed is now ready for further use, and the extraction process can be repeated, optionally starting with the wash with hexane or the like above described, to replace the aqueous alkanol in the interstices between the resin particles or starting with the direct addition of hop extract as in Example 1.

It has been mentioned that the basic ion exchange resin is preferably used in acetate form. Actually, other forms can be used, in which the anion is that of a fairly weak acid, i.e., an acid substantially no stronger than formic acid.

The water-miscible solvent or liquid used throughout is preferably a lower alkanol, e.g., methanol, ethanol, isopropanol, or the like. However substantially any neutral, inert water-miscible liquid is operable, e.g., acetone, dimethyl sulfoxide, and the like. As mentioned, these are used in aqueous solution. The amount of water-miscible liquid in the solution should be at least 50 vol. percent, and can be as high as 95%. A preferred range is 67–80 percent. If desired, two or three different such liquids can be used in the respective steps, e.g., aqueous methanol in the first inclusion step, aqueous ethanol in the elution of acid hydrogen, and aqueous isopropanol in the final isohumulone elution; or any permutation of water-miscible liquids can be used in these steps. It is preferred, however, that the same liquid be used throughout for the sake of simplicity and ease of recovery and reuse.

When the optional varient is employed in which an inert water-immiscible organic liquid used to treat the resin bed to fill the interstices between the resin particles, the nature of that liquid is not critical, the only requirement (in addition to water-immiscibility) being that it be a solvent for isomerized hops. The same considerations apply to the solvent for the initial hop extract. Numerous such liquids are known and available for both uses, especially hydrocarbons and chlorinated hydrocarbons.

Although it is preferred, the solvent for the starting solution of hop constituents and the solvent used to fill the interstices between the resin beads actually need not be identical. However, if two different solvents are used, they should be mutually miscible. For example, the resin interstices can be filled with benzene, and the hop solution can be in cyclohexane, since these two hydrocarbons are mutually soluble in all proportions. And there are many other suitable pairs of different solvents, obvious to these skilled in the art.

It is immaterial which solvent is in the interstices of the resin bead and which is used as the solvent for the initial hop solution. The hydrocarbons are preferred for both uses because they are cheaper. Thus, such liquids can be substantially any inert normally liquid hydrocarbon, e.g., the liquid alkanes and aromatic hydrocarbons, e.g., benzene, toluene, xylene, and the like; and mixtures of these, e.g., petroleum ether. Suitable liquids other than hydrocarbons include: carbon tetrachloride, trichlorethylene, methylene dichloride, and the like.

FURTHER DESCRIPTION OF THE INVENTION

As used in the art, and in this specification, the term "isohumulones" refers to the group of humulones resulting from isomerization of the alpha acid components of hops, and to their reduced forms. Thus the term includes isohumulone, isocohumulone, isoadhumulone, isoprehumulone, and isoposthumulone, as well as the reduced forms of these compounds. Said reduced forms are well known and are obtained by reduction of the starting isohumulones with borohydrides, or hydrogen, etc. The isohumulones as such are weak acids. The term conventionally (and herein) includes their acid as well as their salt forms, as for example, in the case that they are neutralized with sodium hydroxide or other base. In salt or ionic form they, the isohumulones, are frequently referred to as isohumulates, e.g., sodium isohumulate, etc.

Similarly, as used herein, the term "lupulones and residual hop constituents" means materials other than isohumulones, present in isomerized hop extract. As already mentioned, these materials comprise mostly the lupulones (including its reduced forms), essential oils, soft resins, and sundry minor components. A typical analysis of an isomerized hop extract made by a hydrocarbon solvent extraction follows and shows the relative typical ranges of these materials.

|  | California Seedless Hops Typical Content | Isomerized Extract Made from Other Varieties Range |
|---|---|---|
| Isohumulnes | 40% | 15–50% |
| Lupulones | 25% | 10–25% |
| Soft Resins | 25% | Ca. 25% |
| Waxes | 5% | Ca. 5% |
| Oil | 4% | 1–5% |

The strongly basic ion exchange resins required for use in this invention are well known, and their preparation and properties have been extensively described in literature. See Nachod and Schubert, Ion Exchange Technology, Academic Press (1956); Osborn, Synthetic Ion Exchangers, Chapman and Hall, Lts. (1955); Kunin, Elements of Ion Exchange, Reinhold (1960); U.S. Pat. No. 2,591,573; Calmon and Kressman, Ion Exchangers in Organic and Biochemistry, Interscience Publishers, Inc. (1957). They are commercially available under various trade marks, e.g., Dowex 1, Dowex 21K (Dow Chemical Co.), Amberlite IRA 400 (Rohm and Haas Co.), and the like.

In a typical preparation of a strongly basic ion exchange resin, a crosslinked divinyl benzene copolymer resin is first made by suspension polymerization. It is then treated with chloromethyl methyl ether in the presence of a Friedel-Crafts catalyst to attach chloromethyl groups to the benzene rings in the polymer. These chloromethyl groups are then treated with a tertiary amine such as $N(CH_3)_3$, thereby giving the corresponding quaternary ammonium chloride, $-CH_2N^+(CH_3)_3Cl^-$. This gives a so-called type 1 resin. Or the chloromethyl group can be quaternarized with an ethanolamine to give the so-called type 2 resin. It is available commercially in this chloride form. These materials are so strongly basic that they are difficult to convert from the commercially available chloride form to the free base form, even with caustic aoda. For use in the instant invention, the resin should be converted to a weak anion form, preferably to the acetate form, as hereinafter described.

Strongly basic ion exchange resins are conventionally available in lightly-to-medium crosslinked forms, with about 2–4 percent crosslinking (e.g., with divinyl benzene), and these are preferred for use in this invention. More highly cross-linked materials, e.g., 8 percent and up, require increased adsorption and elution cycles, with reduction in yield.

Although we do not wish to be bound to any particular theory as to how the process of this invention operates, our experience with it indicates the following mechanism (exemplified with methanol as the water-miscible liquid, hexane as the water-immiscible liquid, and using the resin in acetate form. When the isomerized hop extract in hexane contacts the aqueous methanol-swollen ion exchange resin, the dissolved isohumulate ions displace acetate ions within the resin. At this stage the resin also acts partly as a screen, in that the lupulones and residual hop constituents, even though dissolved in the incoming hexane solution, are not absorbed in the resin pores and in large part pass completely through the column. Any residue is removed from the column by a subsequent hexane wash. This now leaves the desired isohumulate ions adsorbed in the resin pores, said pores still being swollen with aqueous methanol.

The next step operates to remove the interstitial hexane from the resin bed by washing with aqueous methanol. During this aqueous methanol wash, acetate ion which had been exchanged by isohumulate ion and weakly acidic hop components are eluted from the column. The resin still contains isohumulate ion which can be removed by other ions, e.g., chloride or the like. To do this, the resin is eluted with, e.g., methanol-sodium acetate solution. The acetate ions replace the isohumulate ions in the resin pores, and the latter are washed out with the elution liquor, thereby to give an aqueous alcohol solution of sodium isohumulate which contains also some sodium acetate, but is substantially free from lupulones and residual hop constituents as well as hexane. This solution is now in a form that can be added directly to beer or, if desired, the isohumulones can be recovered therefrom by conventional means.

For example, the solution can be acidified and extracted with petroleum ether. This takes up the isohumulones and leaves the salt behind in the aqueous phase. The petroleum ether solution of isohumulones is then recovered and the solvent is evaporated off, leaving substantially pure isohumulones as residue.

Thus, we have discovered a new method of separating the acidic components of hops, especially from a hexane solution of a preisomerized hop extract using a strongly basic ion exchange resin. Our invention includes the separation of such acidic components from a preisomerized extract, and is particularly useful in the separation of reduced isohumulone from extract prepared in accordance with U. S. Pat. No. 3,044,897. The novelty and utility of our process is the separation of the acidic components of a hop extract in a water-immiscible solvent applied directly to a properly prepared ion exchange column with subsequent very high yield of these acidic components at a high concentration. A process of these attributes has heretofore not been accomplished.

More particularly, we have discovered that the acetate form of a strongly basic crosslinked ion-exchange resin swollen with aqueous methanol will quantitatively remove isohumulone or reduced isohumulone (e.g., catalytically hydrogenated isohumulone or borohydride reduced isohumulone) from a hexane extract of hops. The adsorbed material can be quantitatively recovered from the column by eluting e.g., with methanolic aqueous sodium acetate solutions. The column is prepared and operated by the general procedure described below.

Approximately 50 ml. of wet, strongly basic ion exchange resin, 4 percent cross-linked (Dowex 1 × 4, 20–50 mesh) in the commercially available chloride form was slurried with water overnight. The resin was poured into a 1.1 × 60 cm. column and washed with 1N sodium acetate solution until the effluent from the column was free of chloride ions. The column was washed free of sodium acetate with deionized water followed by aqueous methanol. (Subsequent examples will show the preferred range of alcohol concentration in the aqueous methanol system.) The interstitial aqueous methanol phase was replaced with hexane by descendingly washing out the heavier phase with hexane saturated with aqueous methanol. (The step immediately preceding is optional; it can be omitted, but there will often be a small reduction in yield.) A hexane solution of hop extract containing isohumulone or reduced isohumulone was passed down through the column with hexane, whereby isohumulones in the extract were adsorbed by the ion exchange resin. The interstitial hexane was flushed from the column ascendingly with aqueous methanol. The adsorbed hop acids, i.e., isohumulones, were eluted from the column ascendingly with 4:1 methanol-2N sodium acetate solution. The eluate from the column contained substantially all the pure isohumulones of the original extract, substantially free from lupulones and residual hop constituents. the acidic components were recovered from the eluate by evaporating off the water and methanol, or alternately by extracting the isohumulone by conventional methods well known to those skilled in the chemistry of hop compounds.

Instead of methanol, other lower alkanols can be used, e.g., ethanol, isopropanol, and the like.

Any water soluble compound with an anion with greater affinity for the ion exchange resin than the isohumulate anion will serve to displace the isohumulate anion, for example, chlorides, hydroxides, acetates, formates, and the like.

Of the foregoing, sodium acetate, potassium acetate and ammonium, acetate, as well as the corresponding chlorides, are particularly preferred in the elution of isohumulone, catalytically hydrogenated isohumulone or sodium borohydride reduced isohumulone. The elution may be run ascendingly or descendingly at room temperature or elevated temperatures prudent to good practice. The aqueous alcohol phase in the resin preferably contains at least 50 volume % alcohol, with at least 5 volume percent water. Experience has shown that, within these ranges, column capacity increases as the alcohol concentration increases.

It will be immediately evident to those skilled in the art that numerous modifications are possible within the description of the invention herein given. For example, the solvent for the starting solution of hop constituents may be any organic solvent immiscible with the solvent system used to swell the resin.

The solvent system used to swell the resin must consist of water plus an inert water-miscible organic solvent.

The following examples illustrate without limiting the invention.

EXAMPLE 1

Approximately 50 ml. of Dowex 1 × 4 (20–50 mesh), a strongly basic lightly cross-linked ion-exchange resin in chloride form was slurried with water and poured into a 1.1 × 60 cm. column and converted to the acetate form by passing 250 ml. of N sodium acetate solution through the column. The column was then washed with 100 ml. of 3:1 methanol-water, and 20 ml. of a hexane solution of isomerized and sodium borohydride reduced hop extract prepared by the general procedure of Example 5 of U. S. Pat. No. 3,044,879 and containing 2,876 g. of reduced isohumulone was passed directly through the column followed by hexane until the effluent was practically colorless (40 ml.).

The interstitial hexane was flushed from the column ascendingly with 75 ml. of 3:1 methanol-water and the reduced isohumulone eluted from the column with 4:1 methanol-2M sodium acetate solution yielding 2.831 g. of reduced isohumulone free from lupulones, etc., in 200 ml. of eluate.

EXAMPLE 2

Approximately 50 ml. of Dowel 21K resin (20–50 mesh), a strongly basic lightly crosslinked ion-exchange resin in chloride form was slurried with water and poured into a 1.1 × 60 cm. column and converted to the acetate form by passing 250 ml. of N sodium acetate solution through the column. The residual sodium acetate was washed from the column with 100 ml. of deionized water followed by 100 ml. of 1:1 methanol: water. The interstitial aqueous methanol phase was replaced with hexane. 10 ml. of a hexane solution of an isomerixed and sodium borohydride reduced whole hop extract, prepared by the general procedure of Example 5 of U. S. Pat. No. 3,044,879, and containing about 1.094 g. reduced isohumulone with 2.0 g. lupulones and residual hop constituents was passed through the column. After washing out the interstitial hexane with 2:1 methanol:water, the adsorbed reduced isohumulone was eluted with 4:1 methanol-N sodium chloride solution yielding 1.093 g. of isohumulones free from lupulones, etc. in 250 ml. of eluate.

EXAMPLE 3

The column in Example 2 was regenerated and prepared for use as described in Example 1. 10 ml. of a hexane solution of sodium borohydride reduced whole hop extract solution containing 1.084 g. of reduced isohumulone and obtained as in Example 1 was passed through the column, washed through the column with 40 ml. of hexane followed by ascendingly washing the interstitial hexane out with 75 ml. of 2:1 methanol:water. The adsorbed material was eluted off with 4:1 methanol:2 N sodium acetate solution at 40°C. yielding 0.981 g. of isohumulones substantially free from other hop constituents in 200 ml. of eluate.

EXAMPLE 4

The column in Example 3 was washed ascendingly with 100 ml. of 1:1 methanol:water to remove any fines and the interstitial aqueous phase replaced with hexane. 10 ml. of a hexane solution of sodium borohydride reduced whole hop extract feed solution containing 1.169 g. of reduced isohumulone prepared as above was passed through the column and washed with 40 ml. of hexane. The interstitial hexane was washed from the column with 75 ml. of 2:1 methanol:water and the adsorbed material eluted ascendingly with 4:1 methanol-2N sodium acetate solution at room temperature yielding 1.135 g. of reduced isohumulone substantially free from other hop constituents in 300 ml. of eluate.

EXAMPLE 5

A column was prepared as described in Example 1 using Dowex 1 × 4 resin (20–50 mesh), a strongly basic ion-exchange resin with about 4 percent crosslinking. 10 ml. of a hexane solution of sodium borohydride reduced whole hop extract feed solution prepared as above and containing 1.146 g. of reduced isohumulone was passed through the column followed by 40 ml. of 2:1 methanol:water followed by descending elution 4:1 methanol-2N sodium acetate solution at room temperature yielding 1.195 g. of reduced isohumulone in 250 ml. of eluate, substantially free of lupulone and residual hop components.

EXAMPLE 6

The column from Example 5 was washed with 100 ml. of 3:1 methanol:water and the interstitial aqueous phase replaced with hexane. 20 ml. of a hexane solution of sodium borohydride reduced whole hop extract feed solution prepared as above and containing 2.260 g. of reduced isohumulone was passed through the column followed with 40 ml. of hexane. The hexane phase was replaced by washing ascendingly with 75 ml. of 3:1 methanol:water followed with 4:1 menthanol-2N sodium acetate solution yielding 2.254 g. of recovered isohumulone material in 250 ml. of eluate, substantially free from lupulones, etc.

EXAMPLE 7

50 ml. of a hexane solution of sodium borohydride reduced whole hop extract feed solution prepared as above and containing 5.650 g. of reduced isohumulone was passed through the column prepared as in Example 6 and washed with hexane until the effluent was colorless. The interstitial hexane was flushed from the column with 75 ml. of 3:1 methanol:water and the adsorbed material eluted ascendingly with 4:1 methanol-2N sodium acetate solution yielding 5.518 g. of isohumulone material in 300 ml. of eluate, substantially free from lupulones and residual hop constituents.

EXAMPLE 8

10 ml. of a hexane solution of sodium borohydride reduced whole hop extract feed solution prepared as above and containing 0.950 g. of reduced isohumulone was passed through the column prepared as in Example 6 and washed through with 50 ml. of hexane. The interstitial hexane was flushed from the column with 75 ml. of 3:1 methanol:water and the adsorbed material eluted with 2:1 methanol-2N ammonium acetate solution yielding 0.991 g. of reduced isohumulone, substantially free from lupulones and residual hop constituents.

EXAMPLE 9

The column in Example 5 using Dowex 1 × 4 (20–50 mesh) was regienrated by previous elution of an extract using 4:1 methanol-2N sodium acetate solution. The column was washed with 100 ml. of 3:1 methanol-water and the interstitial aqueous phase replaced with hexane saturated with aqueous phase solution (3:1 methanol:water). 20 ml. of a hexane solution of isomerized hop extract containing 2.28 g. isohumulones and 6.124 g. of total soft resin was passed through the column followed by 30 ml. of hexane. The hexane in the interstices was replaced by washing ascendingly with 75 ml. of 3:1 methanol:water. The adsorbed isohumulone was eluted with 4:1 methanol-2N sodium acetate solution yielding 2.013 g. of isohumulone in 250 ml. of eluate substantially free of lupulone and other hop components.

EXAMPLE 10

The column from Example 9 was washed with 100 ml. of 3:1 acetone-water and the interstitial aqueous phase was replaced with hexane saturated with aqueous phase. Twenty ml. of a hexane solution of an isomerized and sodium borohydride reduced hop extract containing 2.818 g. of reduced isohumulone was washed through the column with hexane, recycling the first 10 ml. of effluent.

The interstitial hexane was flushed from the column ascendingly with 3:1 acetone-water followed by 3:1 methanol-water. The reduced isohumulone was eluted from the column with 4:1 methanol-2M sodium acetate solution yielding 2.026 g. of reduced isohumulone in 250 ml. of eluate.

EXAMPLE 11

The column from Example 10 was washed with 100 ml. of 3:1 dimethyl sulfoxide-water and the interstitial aqueous phase was replaced with hexane saturated with aqueous phase. Twenty ml. of a hexane solution of an isomerized and sodium borohydride reduced hop extract containing 2.920 g. of reduced isohumulone was washed through the column with hexane, recycling the first 10 ml. of effluent.

The interstitial hexane was flushed from the column ascendingly with 3:1 methanol-water until 50 ml. of aqueous phase had passed through the column. The reduced isohumulone was eluted from the column with 4:1 methanol-2M sodium acetate solution yielding 2.312 g. of reduced isohumulone in 200 ml. of eluate.

EXAMPLE 12

The column from Example 11 was converted to the propionate form of the resin by washing with 250 ml. of N sodium hydroxide followed by 100 ml. of deionized water and finally with 250 ml. of N sodium propionate solution. The column was washed free of sodium propionate with deionized water and finally with 100 ml. of 3:1 methanol-water. The interstitial aqueous phase was replaced with hexane saturated with aqueous phase. Twenty ml. of a hexane solution of isomerized and sodium borohydride reduced hop extract containing 2.974 g. of reduced isohumulone was passed through the column followed by 30 ml. of hexane, the first 10 ml. through the column was recycled through the column.

The interstitial hexane was flushed from the column ascendingly with 3:1 methanol-water until 50 ml. of the aqueous phase had passed through the column. The adsorbed reduced isohumulone was eluted with 4:1 methanol-2M sodium propionate yielding 2.875 g. in 200 ml. of eluate.

EXAMPLE 13

The column from Example 12 was converted to the formate form of the resins by washing with 250 ml. of N sodium formate solution followed by 100 ml. of deionized water and then 100 ml. of 3:1 methanol-water. The interstitial aqueous phase was replaced with hexane saturated with aqueous phase. Twenty ml. of a hexane solution of isomerized and sodium borohydride reduced hop extract containing 2.876 g. of reduced isohumulone was passed through the column followed by 30 ml. of hexane, the first 10 ml. of effluent was recycled.

The interstitial hexane was flushed from the column with 3:1 methanol-water until 50 ml. of the aqueous phase had passed through the column. The adsorbed reduced isohumulone was eluted from the column with 4:1 methanol-2M sodium formate yielding 2.216 g. in 200 ml. of eluate.

EXAMPLE 14

A column was prepared as described in Example 1 using Dowex 1 × 4 (20–50 mesh). 10 ml. of a hexane solution containing 1.246 g. of tetrahydroisohumulone, prepared according to the method of Brown et al., (J. Chem. Soc., 1959, 545), was passed down the column and washed through the column with hexane. The interstitial hexane was flushed from the column by ascendingly washing with 3:1 methanol-water until 50 ml. of aqueous phase has been collected. The adsorbed tetrahydroisohumulone was eluted from the column ascendingly with 4:1 methanol-2M sodium acetate solution yielding 1.250 g. of material in 200 ml. of eluate.

EXAMPLE 15

The column in Example 14 was washed with 3:1 methanol water and the interstitial aqueous phase was replaced with carbon tetrachloride. 9 ml. of a carbon tetrachloride solution containing 0.794 g. of isohumulone was washed through the column with approximately 30 ml. of carbon tetrachloride. The interstitial carbon tetrachloride was replaced by descendingly washing the column with 3:1 methanol-water until 50 ml. of aqueous phase has passed through the column. The adsorbed isohumulone was eluted off descendingly with 4:1 methanol-2M sodium acetate solution yielding 0.798 g. in 250 ml. of eluate.

EXAMPLE 16

The column from Example 14 was washed with 3:1 methanol-water and the interstitial aqueous phase replaced with trichloroethylene. 7.25 ml. of a trichloroethylene solution containing 0.648 g. of isohumulone was washed through the column with approximately 30 ml. of trichloroethylene. The interstitial trichloroethylene was replaced descendingly with 3:1 methanol-water until 50 ml. of aqueous phase has passed through the column. The adsorbed isohumulone was eluted descendingly from the column with 4:1 methanol-2M sodium acetate solution yielding 0.634 g. of isohumulone in 240 ml. of eluate.

The isohumulones eluted as described above after concentrating or crystallizing may be added to unhopped beer anytime during the brewing process resulting in substantial increase in hop utilization with retention of those attributes generally considered desirable in a conventionally hopped beer.

The invention claimed is:

1. In the method of separating isohumulones from lupulones and residual hop constituents in solution in an inert water-immiscible organic liquid selected from the group consisting of carbon tetrachloride, trichlorethylene, methylene, dichloride, hexane, petroleum ether, cyclohexane, benzene, toluene, and xylene, the improvement comprising:

i. contacting a bed of particles of a strongly basic ion exchange resin pretreated with the anion of a weak acid selected from the group consisting of formate, acetate, and propionate; said particles being swollen with an aqueous solution of an inert water-miscible liquid with said solution of isohumulones, lupulones, and residual hop constituents; with water-miscible liquid being selected from the group consisting of methanol, ethanol, isopropanol, acetone, and dimethylsulfoxide;

ii. washing the resulting resin bed with 50–95 volume percent aqueous solution of an inert water-miscible liquid selected from the group consisting of methanol, ethanol, isopropanol, acetone, and dimethylsulfoxide;

iii. eluting the resulting resin bed with a 50–95 volume percent aqueous solution of an inert water-miscible liquid selected from the group consisting of methanol, ethanol, isopropanol, acetone, and dimethylsulfoxide, said solution containing 1–5, 12g/100 ml of an ionized compound selected from the group consisting of ammonium acetate, sodium acetate, potassium acetate, sodium propionate, and sodium formate; and iv. recovering an eluate consisting essentially of a solution of said isohumulones and said compound in said respective water-miscible liquid.

2. The method according to claim 1 in which the water-immiscible liquid is n-hexane.

3. The method according to claim 1 in which the water-miscible liquid is a methanol: water solution of 2–4 volumes of methanol per volume of water.

4. The method according to claim 1 in which the anion of a weak acid in i) is acetate.

5. The method according to claim 1 in which the ionized compound is sodium acetate in 1–5 g./100 ml concentration.

6. The method according to claim 1 in which the isohumulones are pre-reduced.

* * * * *

UNITED STATES PATENT OFFICE
CERTIFICATE OF CORRECTION

Patent No. 3,759,999  Dated Sept. 18, 1973

Inventor(s) William C. Herwig and Donald H. Westermann

It is certified that error appears in the above-identified patent and that said Letters Patent are hereby corrected as shown below:

| In | Change | To Read |
|---|---|---|
| Col. 1, line 35 | "commerical" | --commercial-- |
| Col. 2, line 31 | "Dowey" | --Dowex-- |
| Col. 4, line 43 | "varient" | --variant-- |
| Col. 8, line 22 | "2,876" | --2,876-- |
| Col. 8, line 33 | "Dowel" | --Dowex-- |
| Col. 10, line 6 | "regienrated" | --regenerated-- |
| Col. 12, line 27 | "with" | --said-- |
| Col. 12, lines 40-41 | "1-5,12g/100" | --1-5.12 g/100-- |

Signed and sealed this 22nd day of January 1974.

(SEAL)
Attest:

EDWARD M. FLETCHER, JR.
Attesting Officer

RENE D. TEGTMEYER
Acting Commissioner of Patents